L. R. HETZLER ET AL 2,992,383

REGULATING APPARATUS FOR GENERATORS

Filed Aug. 22, 1958

INVENTORS.
Lewis R. Hetzler
Thomas E. Kirk

BY

Their Attorney

United States Patent Office 2,992,383
Patented July 11, 1961

2,992,383
REGULATING APPARATUS FOR GENERATORS
Lewis R. Hetzler, Anderson, and Thomas E. Kirk, Indianapolis, Ind., assignors to General Motors Corporation, Detroit, Mich., a corporation of Delaware
Filed Aug. 22, 1958, Ser. No. 756,686
7 Claims. (Cl. 322—28)

This invention relates to transistor voltage regulating apparatus and circuits for use with the electrical system of a motor vehicle, and is a continuation-in-part of application Serial No. 720,467, filed March 10, 1958, and assigned to the assignee of this invention.

It is an object of this invention to provide a voltage regulating circuit for a direct-current power source of a motor vehicle that includes a generator having a field winding and wherein the current flow through the field winding is controlled by the conduction of a transistor that is connected in series therewith and whose conduction is, in turn, controlled by a relay of the electromagnetic vibratory type having switch contacts connected in the base circuit of the transistor. In carrying this object forward it is manifest that the direct-current power source may take various forms and thus may be a direct-current generator or could be any type of alternating-current generator having an A.C. output that is rectified to D.C. by a suitable rectifier arrangement.

A further object of this invention is to provide a voltage regulating circuit for the direct-current power source of a motor vehicle that includes a transistor that is connected in series with a control winding of the power source and wherein the control winding is connected between one side of the power source and the emitter electrode of the transistor and wherein both the base and collector electrodes of the transistor are connected directly to the opposite side of the power source. This circuit arrangement is self-regulating and provides for accurate control of the field current of the power source.

Another object of this invention is to provide a voltage regulating circuit for a direct-current power source that includes a transistor and a relay having a main winding and an accelerating winding, the transistor being connected in series with the control winding of the power source and wherein the accelerating winding and contacts of the relay are connected in the base circuit of the transistor, the main winding of the relay being connected directly across the output terminals of the power source.

Another object of this invention is to provide a voltage regulating circuit for a direct-current power source that includes a transistor and a relay having both a main actuating winding and an accelerating actuating coil winding and wherein the main winding is connected directly across the direct-current power source, the accelerating winding being connected in series with the relay switch contacts and across the power source and wherein the relay switch contacts control base current flow of the transistor, the emitter-collector circuit of the transistor being connected in series with a control winding of the power source and across said power source.

Another object of this invention is to provide a voltage-regulating circuit for a direct-current power source of a motor vehicle that includes a generator having a field winding and wherein the current flow through the field winding is controlled by the conduction of a transistor, the electrical system of the motor vehicle having a ground circuit and wherein the collector electrode of the transistor is connected directly to the ground circuit, the conduction of the transistor being controlled by a relay having switch contacts connected in the base circuit of the transistor and having an actuating coil connected across the output terminals of the power source. With this circuit arrangement certain economies in manufacture of the regulating circuit are achieved as will become more readily apparent hereinafter.

Still another object of this invention is to provide a regulator including a metal base that supports a relay and a transistor, the transistor having a metal case that forms the collector electrode thereof which is in electrical contact with the base, and wherein the frame of the relay is secured to and in electrical contact with the base, the frame carrying a switch contact that is in electrical contact with the frame and which forms one contact of a pair of contacts that are connected in the base circuit of the transistor to control the conduction of the transistor in response to opening and closing of said pair of contacts. The metal base is adapted to be connected to a metal part of a motor vehicle that is at ground potential, whereby the collector electrode of the transistor and the switch contact supported by the frame of the relay are at ground potential by reason of their connection to said common base.

A further object of this invention is to provide a regulator including a metal base that supports a relay, the base also carrying a metal heat sink member that forms a support for a transistor having a metal case that is in contact with the heat sink member and which forms the collector electrode of the transistor.

Further objects and advantages of the present invention will be apparent from the following description, reference being had to the accompanying drawings wherein a preferred embodiment of the present invention is clearly shown.

Figure 1:
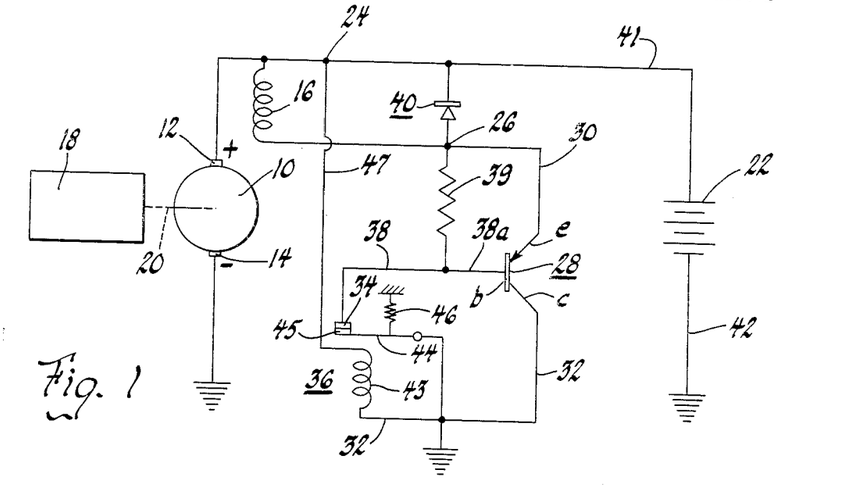
FIGURE 1 is a circuit diagram illustrating the voltage regulating circuit of this invention as used with a direct-current generator.

Referring now to the drawings, and more particularly to FIGURE 1, a motor vehicle regulating circuit that is connected with a shunt-wound direct-current generator is shown. The direct-current generator comprises an armature 10 having a positive output terminal 12 and a negative output terminal 14 that is connected directly to ground. This connection to ground may be made by connecting the terminal 14 to a suitable metal part of the motor vehicle which forms the ground return circuit for the motor vehicle electrical circuit. The generator has a shunt field winding 16 that has one side connected with the positive terminal 12. The armature 10 of the generator is driven by the engine 18 of the motor vehicle through suitable torque transmitting means illustrated schematically and denoted by reference numeral 20.

The regulating circuit that is connected between the direct-current generator and a storage battery 22 has a generator terminal 24 connected with the positive side of armature 10 and has a field terminal 26 connected to one side of field winding 16. The circuit components of the regulating circuit include a P-N-P junction transistor 28 having a base electrode $b$, an emitter electrode 3, and a collector electrode $c$. The transistor 28 could be of the N-P-N type where a positive ground circuit is employed. The emitter electrode of the transistor is connected directly to field terminal 26 by a lead 30. The collector electrode of transistor 28 is connected with a lead 32 that is grounded as shown. The base electrode of transistor 28 is connected to a fixed contact 34 of a relay generally designated by reference numeral 36 by means of leads 38 and 38a. A resistor 39 is connected between field terminal 26 and the junction of leads 38 and 38a and is thus connected across the base and emitter electrodes of transistor 28. A diode 40 is connected between field terminal 26 and a lead 41 which connects the positive side of storage battery 22 and the generator terminal 24. The opposite side of storage battery 22 is connected directly to ground through a lead 42.

The relay 36 includes an actuating coil 43, a movable armature 44, a contact 45 carried by the movable armature and engageable with contact 34, and a spring 46 for holding the contacts 34 and 45 in engagement. This relay is of the well-known electromagnetic vibratory type and when the actuating coil is energized with a predetermined voltage, the armature 44 is attracted to open contacts 34 and 45. When the energization of the actuating coil is reduced, the spring 46 moves the contacts 34 and 45 into engagement with each other and this action progresses at a rapid rate, thereby bringing about a rapid opening and closing of these contacts, as is well-known to those skilled in the art. The actuating coil 43 has one side connected to ground through lead 32 and has its opposite side connected with generator terminal 24 via a lead 47. It is to be understood that all the ground connections shown in the circuit in FIGURE 1 are made by connecting the grounded parts to suitable metal parts of the motor vehicle that form the ground return system. This ground will be at a negative polarity since the negative terminal of the generator is connected directly to ground.

Although no current regulating relay is shown connected with the circuit of FIGURE 1, it will be apparent to those skilled in the art that such a relay might be connected with the circuit of FIGURE 1 to regulate the current output of the generator. This circuit might also have the usual cut-out relay for connecting the battery with the generator when the generator is operating and for disconnecting the generator from the battery when the generator is not producing an output voltage.

The circuit of FIGURE 1 operates to maintain a predetermined terminal voltage for the armature 10 by regulating the current flow through field winding 16. The field winding 16 is connected between the positive terminal of armature 10 and ground through the emitter-collector circuit of transistor 28. The field current may thus be regulated by regulating the conduction from emitter to collector of transistor 28 and this is accomplished by the opening and closing of contacts 34 and 45 in response to the voltage that is impressed across actuating coil 43. Since the emitter-to-collector current flow in a transistor is proportional to the emitter-to-base current of a transistor, it is apparent that its conduction from emitter to collector may be controlled by controlling the emitter-to-base current. When contacts 34 and 45 are closed, the base of transistor 28 is connected directly to ground and the emitter-to-base current is at a maximum. This occurs when the terminal voltage of the armature 10 is below a predetermined desired level. In this condition of operation, the emitter-to-collector current of the transistor 28 will be greatly increased to provide for substantially full field current through the transistor with a consequent increase in the terminal voltage of the armature 10. When the contacts 34 and 45 are open, the base circuit of the transistor 28 is open and therefore no base current is permitted to flow to ground. In this condition of operation, the emitter-to-collector current being proportionate to base current will be substantially zero and the transistor will be cut off to exhibit considerable resistance to current flow through the transistor to ground. The terminal voltage of the armature 10 will thus be decreased by reduction of current flow through the field winding 16. It will be appreciated that this action occurs very rapidly due to the rapid opening and closing of the contacts 34 and 45. It also will be apparent that the arcing between the contacts 34 and 45 will be greatly reduced over prior regulator structures as no great amount of field current will flow through the contacts 34 and 45, this current flowing to ground through transistor 28. The resistor 39 is connected in the circuit to stabilize operation of the regulating circuit whereas the diode 40, which is connected between generator terminal 24 and field terminal 26 suppresses transient voltage surges being set up by field winding 16.

It should be noted that the particular regulating circuit illustrated in FIGURE 1 is substantially self-regulating and no resistors are needed in the base circuit to control base current. This self-regulation is automatic since base current is a function of emitter-to-base voltage. The emitter-to-base voltage is, in turn, a function of emitter-to-collector voltage. Should insufficient base current be provided, the emitter-to-collector voltage will rise thus providing an increased emiter-to-base voltage to automatically increase the base current to the required level.

Figure 2:
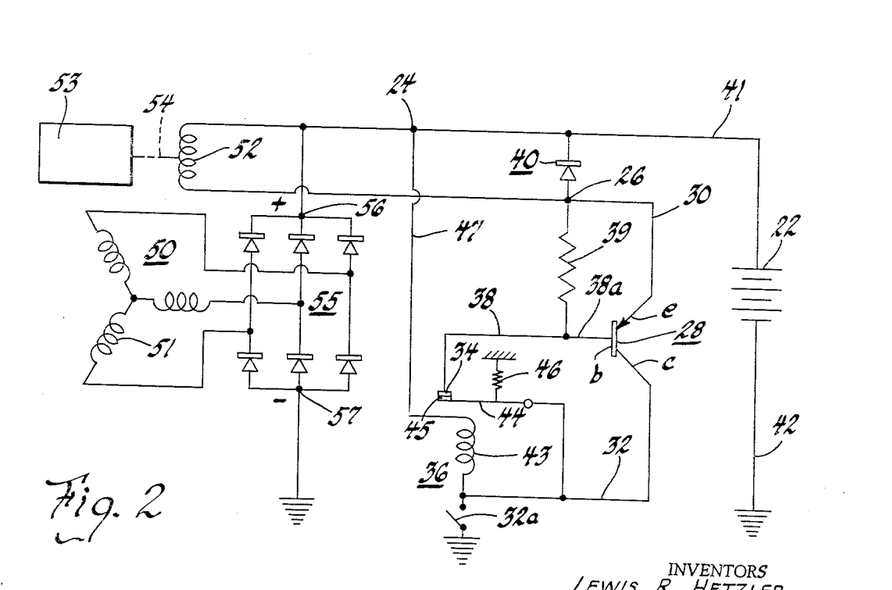
FIGURE 2 is a circuit diagram illustrating the voltage regulating circuit of this invention as used with an alternating-current generator.

Referring now to FIGURE 2 a regulating circuit identical with the circuit shown in FIGURE 1 is illustrated connected with an alternating-current generator. The same reference numerals have been used in each figure to identify the same parts. In FIGURE 2 an alternator generally designated by reference numeral 50 has a three-phase Y-connected output winding 51 and a field winding 52 that is driven by an engine 53 through suitable torque transmitting means 54. The field winding 52 in this case is the rotatable part of the alternator as is well known to those skilled in the art. The stator or output winding 51 is connected with a three phase full-wave bridge rectifier 55 having a positive output terminal 56 and a negative output terminal 57. The positive output terminal 56 is connected with generator terminal 24 whereas the negative output terminal 57 is connected directly to ground as shown. One side of the field 52 is connected with generator terminal 24 whereas the opposite side of the field is connected with field terminal 26. In the circuit of FIGURE 2, a manually operable switch 32a is connected between lead 32 and ground. The switch prevents energization of the field winding from the storage battery 22 when the switch is in an open position. The switch 32a may be controlled by the ignition switch of an internal combustion engine or could be any other type of switch that is closed when the engine is running and open when the engine is not operating. The operation of the regulating circuit shown in FIGURE 2 is identical with the operation of the regulating circuit shown in FIGURE 1, the field current through coil 52 being controlled by the conduction of transistor 28. Since this action was described in detail in connection with FIGURE 1, no further description is deemed necessary.

Referring now more particularly to FIGURES 3, 4, 5 and 6, a physical embodiment of the regulator illustrated in FIGURES 1 and 2 is shown. The same reference numerals have been used in FIGURES 3 through 6 that were used in FIGURES 1 and 2 to identify the parts shown schematically in FIGURES 1 and 2.

The regulator structure shown in FIGURES 3 through 6 comprises a metal base 60 having side flanges 61 and 62 that are formed integral with the base. The side flanges have slots 63 that receive hollow elastomeric grommets 64 and 65 having annular slots (not shown) that receive the edges of the side flanges. The grommets receive respectively metal inserts 64a and 65a having end flanges which tightly compress the grommets against the side flanges 61 and 62. These inserts extend through the hollow grommets and are adapted to receive mounting bolts such as bolts 66 for mounting the base 60 to a metal part 67 such as the firewall of a motor vehicle. A metal plate 68 is riveted to the side flange 62 and contacts the metal inserts that pass through grommets 65. When the mounting bolts are in engagement with plate 68, it electrically connects the metal ground return portion of the motor vehicle and the base 62.

The base 60 carries the relay 36. This relay comprises a frame 70, a core member 71, an armature 44 pivotally supported by the frame 70, and a bracket 72 that supports an L-shaped arm 73. The core 71 of the relay is attached to a rivet 74 which serves to hold the core and frame of the relay fixed to the base 60. The core is wound with a suitable actuating coil winding 43 which has one end (not shown) connected to the core 71 and thus directly connected to base 60. The L-shaped arm 73 carries the electrical contact 34 and is suitably insulated from bracket 72 by insulators 73a and 73b. The contact 45 is carried by armature 44, the armature at times being moved toward core 71 against the bias of spring 46 when the actuating coil 43 is suitably energized. The spring 46 is connected between a bracket 75 and the armature 44, as shown, to constantly bias the contacts 34 and 45 into engagement with one another.

The base 60 has an opening 76 which is covered by a metal heat sink member 77. The metal heat sink member 77 is formed of copper or the like, and has heat dissipating fins 78 extending downwardly therefrom. The heat sink member 77 is spot welded to the lower side of base member 60 and is thus in good electrical contact therewith.

Figure 4:
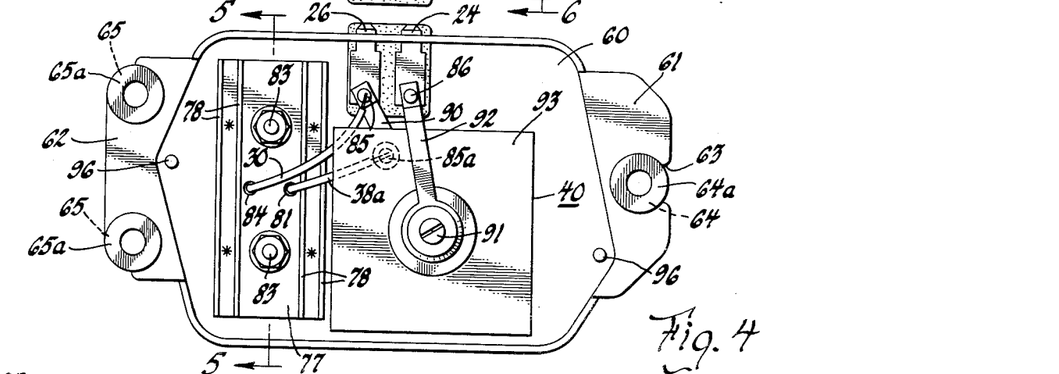
FIGURE 4 is a lower plan view of the regulator shown in FIGURE 3.
Figure 5:
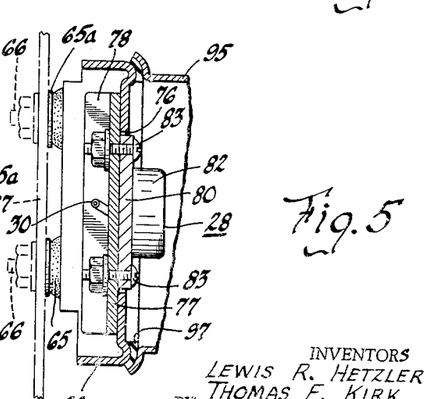
FIGURE 5 is a partial sectional view taken along line 5—5 of FIGURE 4.

The transistor 28 has a case including a solid metal base 80 formed of copper or the like and a cylindrical metal section 82 which is welded or otherwise secured to the base 80. The case contains two layers of "P"-type material such as "P"-type germanium separated by a thin wafer of "N"-type material such as "N"-type germanium. One of the layers of the "P"-type material is connected with the metal base 80 and is the collector electrode of the transistor. The case of the transistor thus becomes the collector electrode of the transistor. The metal base 80 is connected directly to heat sink member 77 by threaded fasteners 83, as shown. The heat sink member is thus in good electrical contact with the case of the transistor and is also in good heat transfer relationship therewith so that the heat generated by the junction transistor is readily transferred to the heat sink member 77. The base and emitter electrodes 81 and 84 of the transistor 28 are connected respectively to the "N"-type and other "P"-type material in the case and extend downwardly from the transistor case where they are connected respectively with leads 38a and 30. The emitter and base electrodes are both suitably insulated from the base 80 and pass through openings formed in the heat sink member 77, as is illustrated in FIGURES 4 and 5.

Figure 6:
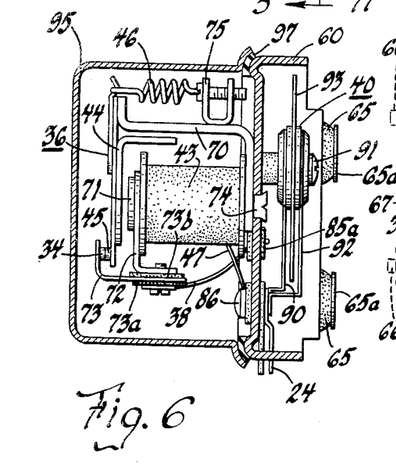
FIGURE 6 is a sectional view taken along line 6—6 of FIGURE 3.

The base 60 carries the generator terminal 24 and the field terminal 26. These terminals are fixed to the base 60 by rivets 85 and 86 which are suitably insulated from the base but which are in electrical contact with their respective rivets. The connectors 24 and 26 are likewise suitably insulated from base 60. The lead 30 that is connected with the emitter of transistor 28 is soldered or otherwise secured to terminal 26. The rivet 85 is connected to one side of wire-wound resistor 39, as shown, while the other side of the resistor is connected to a rivet 85a that is suitably insulated from base 60. The rivet 85a is connected to L-shaped member 73, and thus to contact 34, by lead 38. This rivet is also connected to lead 38a which is connected with the base electrode of transistor 28. The field terminal 26 is connected with a flat metal conductor 90 that is, in turn, connected to one side of diode 40. The diode 40 is of the dry metal type and is supported from base 60 by a threaded fastener 91 and is suitably electrically insulated therefrom. The opposite side of diode 40 is connected by means of a flat metal conductor 92 to the field terminal 24. The diode has a conventional heat conducting fin 93 as is illustrated in FIGURES 4 and 6.

Figure 3:
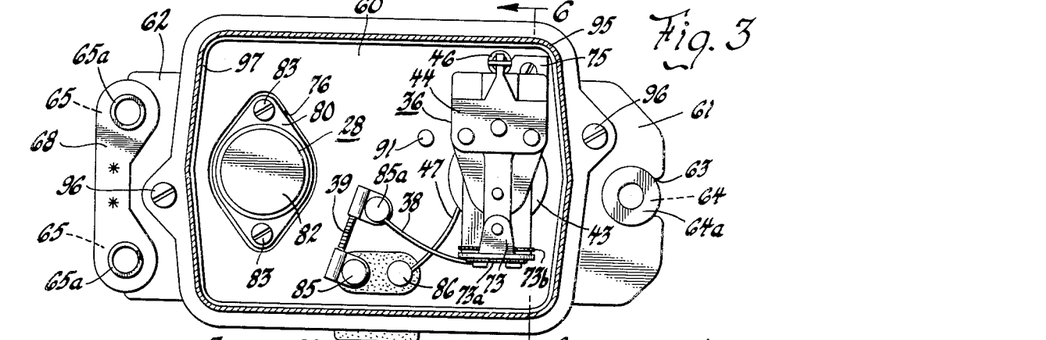
FIGURE 3 is a top plan view with parts broken away illustrating the physical structure of the regulator of this invention.

The rivet 86 that is connected with generator terminal 24 is connected to one side of actuating coil 43 by means of lead 47. The opposite side of the actuating coil, as has been noted above, is connected directly to the base 60 of the regulator through the core 71 of the relay.

The electrical components mounted on base 60 are enclosed by a cover 95 that is held to the base by suitable threaded fasteners 96, there being a seal 97 interposed between the cover and base. With the regulator structure just described, it will be apparent that the components connected directly to base 60 will be at ground potential when the side flanges 61 and 62 are mounted on a metal part of the motor vehicle such as the firewall thereof. The base 60 thus corresponds to the lead 32 shown in FIGURE 1. It will also be readily apparent that the collector electrode of transistor 28 is connected directly to ground by reason of the fact that the collector is the case of the transistor. In addition, it is to be particularly noted that the transistor will be maintained relatively cool by heat conduction to the heat sink member 77.

By providing a regulator wherein the case of the transistor is grounded, the manufacture of the regulator is greatly facilitated as certain of the various parts of the regulator may be mechanically and electrically connected directly to the base of the regulator which is at ground potential when the base is secured to a metal part of a motor vehicle. This construction provides for efficient cooling of the transistor and eliminates the need for electrically insulating the transistor collector from the regulator base.

Figure 7:
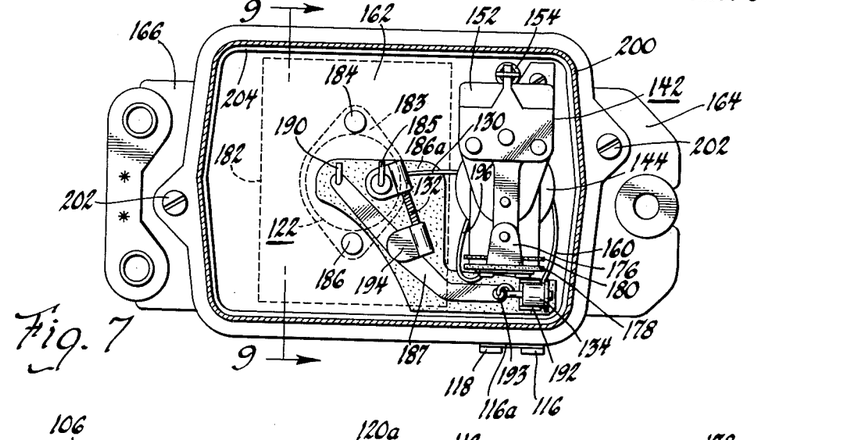
FIGURE 7 is a top plan view with parts broken away of a modified transistor voltage regulator made in accordance with this invention.
Figures 8, 9:
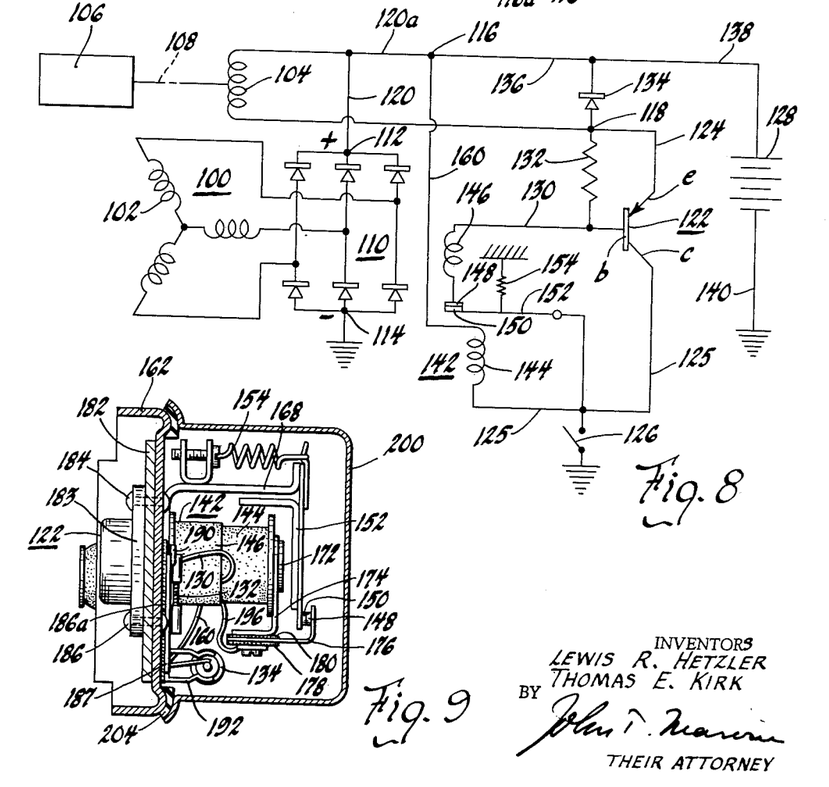
FIGURE 8 is a circuit diagram of a modified transistor voltage regulating circuit that is connected with an alternating-current generator.
FIGURE 9 is a sectional view taken along line 9—9 of FIGURE 7.

Referring now more particularly to FIGURES 7, 8 and 9, a modified transistor regulator is shown. In FIGURE 8, the regulator circuit is illustrated schematically. In this figure an alternating-current generator generally designated by reference numeral 100 has a three-phase Y-connected output winding 102. The alternator has a rotatable field winding 104 that is connected to be driven by an engine 106 through suitable torque transmitting means 108. The alternator may be of any type well known to those skilled in the art. The output winding 102 is connected with a three-phase full-wave bridge rectifier designated in its entirety by reference numeral 110. The bridge rectifier has a positive output terminal 112 and a negative output terminal 114 that is grounded as shown.

The regulator for the alternator-rectifier power unit just described has a generator terminal 116 and a field terminal 118. The generator terminal 116 is connected with one side of coil of the field winding 104 of alternator 100, while the opposite side of the field winding is connected with field terminal 118. The positive output terminal 112 of the bridge rectifier is connected with terminal 116 by means of leads 120 and 120a. The regulator circuit includes a P-N-P junction transistor 122 having an emitter electrode e, a base electrode b, and a collector electrode c. The emitter electrode e is connected directly to field terminal 118 by a lead 124. The collector electrode c is connected with a lead 125 that is, in turn, connected to one side of a switch 126. The opposite side of the switch is grounded as shown. The switch 126 is preferably manually operated either directly by manual operation or through a relay and operates to break the field circuit from battery 128 to field 104 when the switch is open.

The base electrode of transistor 122 is connected with a lead 130. A resistor 132 is connected between the lead 130 and the field terminal 118. A silicon diode 134 is connected between field terminal 118 and generator terminal 116 by means of a lead 136. The generator terminal 116 is connected with the storage battery 128 by means of leads 136 and 138. The opposite side of the storage battery is grounded through a lead 140.

The regulating circuit shown in FIGURE 8 has a conventional electromagnetic vibratory relay generally designated by reference numeral 142 and including a main coil winding 144 and an accelerating winding 146. This relay further includes a fixed contact 148 and a movable contact 150 carried by armature 152. The contacts 148 and 150 are held in engagement with each other by a spring 154.

The accelerating winding 146 of relay 142 is connected between fixed contact 148 and lead 130. This winding is thus connected in the base circuit of transistor 122, the base current from this transistor flowing through accelerating winding 146 to ground when contacts 148 and 150 are in engagement. The main coil winding 144 of relay 142 is connected between lead 125 and a lead 160 that is, in turn, connected with generator terminal 116. The coil winding 144 is thus connected directly across the output terminals of bridge rectifier 110. The coil windings of coils 144 and 146 are wound so that their fluxes are additive when current is flowing through them from the positive side of rectifier 110 to ground.

The operation of the circuit shown in FIGURE 8 is similar to the operation of the circuit shown in FIGURES 1 and 2, but differs in that the operation of the circuit shown in FIGURE 8 is modified by the use of the accelerating winding 146. When the voltage appearing across terminals 112 and 114 of bridge rectifier 110 is above a predetermined desired value, the current flow through coil windings 144 and 146 operates to set up additive magnetic fluxes which open contacts 148 and 150 against the bias of spring 154. The opening of contacts 148 and 150 breaks the base circuit of transistor 122 so that base current cannot flow from the base of the transistor to ground. Since the emitter-to-collector current of transistor is proportional to emitter-to-base current thereof, the transistor exhibits a high resistance from emitter-to-collector during the time that the base circuit is broken. With the transistor thus substantially non-conducting, the current flow through field 104 is reduced sharply to reduce the output voltage of winding 102.

When the voltage at the output terminals of bridge rectifier 110 is low, the actuating coils 144 and 146 of relay 142 are not energized sufficiently to hold contacts 148 and 150 open and these contacts close under the influence of spring 154. With the contacts 148 and 150 closed, base current may flow from transistor 122 directly to ground. This current flow turns on the transistor from emitter to collector so that the field current of field 104 is greatly increased to increase the output voltage of winding 102. It will be appreciated that the opening and closing of contacts 148 and 150 progresses at a rapid rate so that the transistor 122 is constantly turned on and off to regulate the current passing therethrough from field winding 104. The transistor 122 being connected directly in series with field winding 104 and across the output terminals of bridge rectifier 110 regulates the current flow through the field to regulate the output voltage of the alternator in an efficient and simple manner. It is to be noted that the accelerating winding 146 of the relay 142 provides for a rapid response of the relay in opening the contacts 148 and 150. The accelerating winding is supplied with base current from transistor 122 and when the contacts 148 and 150 are open, the accelerating winding is completely de-energized whereas the main winding 144 remains energized. It has been found that this circuit arrangement provides for very accurate and fast response of control in controlling the output voltage of alternator 100. Although the regulating circuit of FIGURE 8 has been shown for use with an alternating-current generator, it will be readily apparent that the circuit could be used with a direct-current generator in a fashion similar to that shown in FIGURE 1.

The physical construction of the regulating circuit shown in FIGURE 8 is illustrated in FIGURES 7 and 9 and like reference numerals have been used in each figure to identify identical parts in each figure. The regulator, as shown in FIGURES 7 and 9, comprises a metal base 162 that has side flanges 164 and 166. These side flanges are identical with the side flanges of the regulator base shown in FIGURE 3 and carry rubber grommets in a manner identical with the construction shown in FIGURES 3 through 5. This base structure is adapted to be connected to a metal part of a motor vehicle in a manner similar to the connection of the regulator shown in FIGURES 3 through 5. The regulator base carries the relay 142 which includes a frame 168 that carries the armature 152 that is pivoted to the top edge of the frame in a manner well known to those skilled in the art. The relay further includes a metal core 172 that is riveted to the base in a manner as is illustrated in FIGURE 6. The core 172 and frame 168 are thus directly held to the metal base 162 by a riveting operation. The core 172 is wound with the main coil winding 144 and with the accelerating coil winding 146 as is illustrated in FIGURE 9. One side of the main coil winding 144 is connected directly to core 172 and thus is in direct electrical contact with the base 162 of the regulator. The core 172 carries a bracket 174 which, in turn, supports an L-shaped bracket 176. The L-shaped bracket is insulated from bracket 174 by insulating material 178 and 180. The armature 152 carries contact 150 whereas the L-shaped bracket 176 carries the contact 148.

The base 162 supports a metal heat sink member 182 that has a rectangular shape and which may be formed of aluminum or the like. This heat sink member is supported from the base by rivets 184 and 186 which also serve to hold the transistor 122 against the metal heat sink member 182. The transistor 122 is identical in construction with the transistor 28 illustrated in FIGURES 3 and 5 and has a metal base 183 in contact with the metal heat sink member 182. The case of this transistor is the collector electrode thereof and is thus electrically connected with the base 162 through rivets 184 and 186. The transistor 122 has a base electrode 185 that projects upwardly through heat sink member 182 and metal base 162 where it is soldered to one side of wire-wound resistor 132. The base electrode is spaced from or is suitably insulated from heat sink 182 and from base 162 and projects through a sheet of insulating material 186 that supports a strip metal conductor 187. The emitter electrode 190 of transistor 122 in a like manner projects through heat sink 182 and metal base 162 where it is soldered or otherwise connected to metal strip 187. This electrode is likewise suitably spaced from or electrically insulated from heat sink 182 and metal base 162.

The metal strip 187 that is connected with emitter electrode 190 is connected to one side of silicon diode 134 that is suitably supported from insulating material 186a by a fuse clip 192 having resilient fingers engaging the silicon diode. The opposite side of the silicon diode is electrically connected with the fuse clip. The fuse clip is preferably held to the metal base 162 and insulating material 186a by means of a rivet, not shown, which is connected to the generator terminal 116 that extends through the side of the base 162 and which is insulated therefrom by insulation 116a. The metal conductor 187 is connected with field terminal 118 by means of a rivet 193 that passes through the base 162 and which is connected with the field terminal 118. Field terminal 118, like terminal 116, projects through an opening in the side of the regulator base and is insulated therefrom by insulation 116a. One side of resistor 132 is soldered or otherwise secured to metal strip 187 at 194. The accelerator coil winding 146 has one side thereof connected with resistor 132 by lead 130 that is soldered to one side of the transistor or otherwise secured thereto. The opposite side of the accelerator winding is connected with contact 148 by means of lead 196 which is secured to bracket 176 in any suitable manner. As has been noted above, one side of the main actuating coil 144 is internally connected with core 172 while the other side thereof is connected to fuse clip 192 by means of lead 160 that is soldered or otherwise secured to the fuse clip. It will be appreciated that the base 162 corresponds electrically to the lead 125 shown in FIGURE 8.

The regulator shown in FIGURES 7 and 9 has a cover 200 held to the base by fasteners 202. The cover is spaced from the base 162 by suitable sealing material 204.

The base members 60 and 162 of the regulator structures shown respectively in FIGURES 3 through 6 and FIGURES 7 and 9 have been disclosed as being directly electrically connectable with the metal part of a motor vehicle. It will be apparent, however, that in the circuits of FIGURES 2 and 8 the base of the regulator must be insulated from ground and is only connected to ground when switch 32a or switch 126 is closed. This insulating of the base of the regulator from ground may be accomplished in any suitable manner and could be accomplished by removing metal part 68 from the base, as the rubber grommets would then insulate the base from ground. It will, of course, be appreciated that the circuit between the field and battery of FIGURES 2 and 8 could be broken by placing a switch between the "hot" side of the battery and the field, for instance, in series with lead 41 or 138. In such a construction, of course, the base of the regulator would be directly electrically connected to the metal ground of a motor vehicle.

Figure 10:
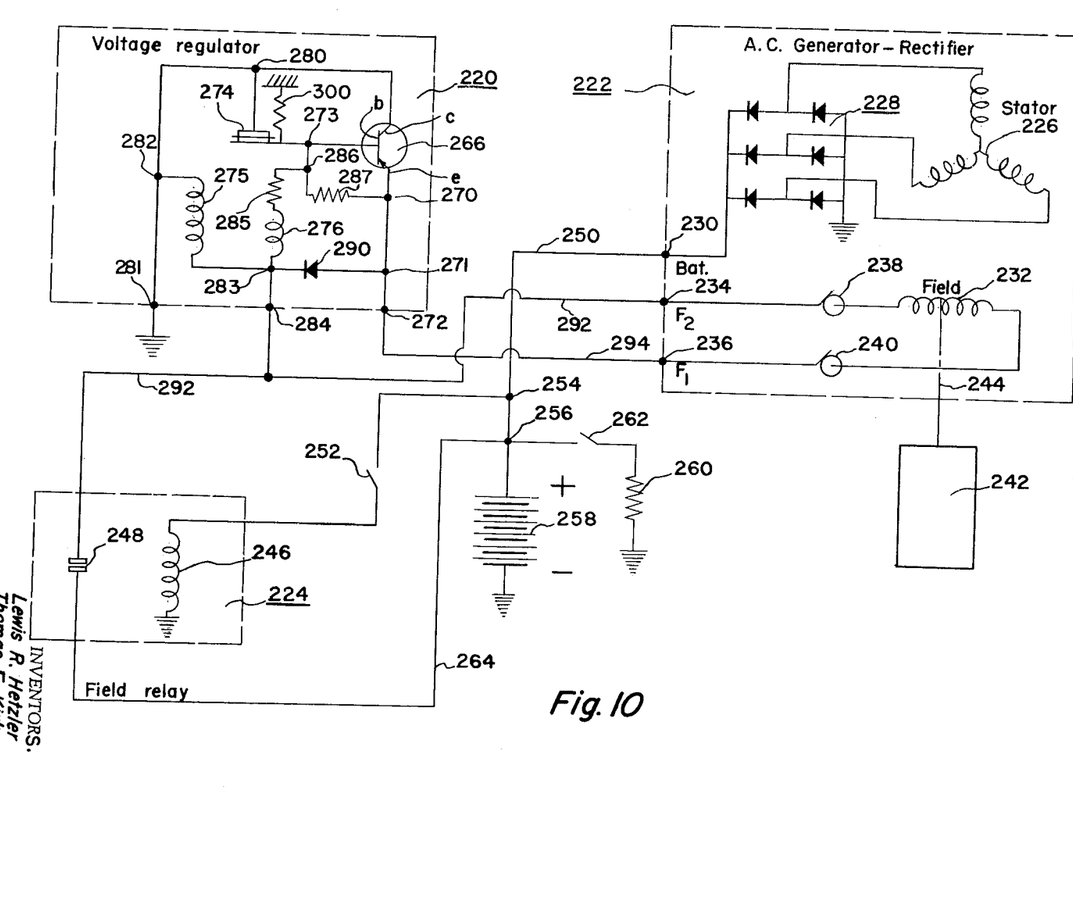
FIGURE 10 is a circuit diagram of still another modified transistor voltage regulating circuit made in accordance with this invention.

Referring now to FIGURE 10, a modified voltage regulating circuit generally designated by reference numeral 220 is illustrated connected with an alternator-rectifier combination generally designated by reference numeral 222. The circuit also includes a field relay generally designated by reference numeral 224 which controls the application of field power to the field winding of the A.C. generator. The voltage regulator, generally designated by reference numeral 220, is similar to the regulator illustrated in FIGURE 8 but differs from this regulator circuit in the connection of the accelerating winding of the relay as will be more fully described hereinafter.

The A.C. generator shown in FIGURE 10 comprises a three-phase Y-connected output winding 226 which is connected with a three-phase full-wave bridge rectifier circuit generally designated by reference numeral 228. One of the output terminals of the bridge rectifier is connected directly to ground as shown, whereas the other output terminal is connected with a terminal 230. The field winding of the A.C. generator is designated by reference numeral 232 and is connected with terminals 234 and 236 through slip rings 238 and 240. The generator is preferably of the type having a rotatable field which is driven by an engine 242 of a motor vehicle through suitable torque transmitting means designated by reference numeral 244 and shown schematically in FIGURE 10.

The field relay 224 includes an actuating coil 246 which operates to magnetically close relay contacts 248 whenever the coil 246 is energized. One side of the relay coil 246 is connected directly to ground as shown, whereas the opposite side is connected with a lead 250 through an ignition switch 252. The relay coil is connected to lead 250 through the ignition switch at junction 254. The junction 254 is connected with a junction 256 which is in turn connected to one side of a storage battery 258. The opposite side of the storage battery is connected directly to ground as shown. The terminal 256 is also connected with the motor vehicle electrical loads designated by reference numeral 260 through a switch 262. The opposite side of the electrical loads are shown connected directly to ground. The junction 256 is also connected to one side of relay contacts 248 through a lead 264.

The voltage regulating circuit illustrated in FIGURE 10 and generally designated by reference numeral 220 comprises a transistor 266 having an emitter electrode e, a base electrode b, and a collector electrode c. The emitter electrode of transistor 226 is connected with junctions 270, 271 and 272 through a common lead as shown. The base electrode of transistor 226 is connected with junction 273 and to one side of a pair of relay switch contacts 274. The relay switch contacts form a part of any well-known relay that includes a main actuating coil winding 275 and an accelerating coil winding 276. The main and accelerating coil windings may be wound on the same core and the relay may be of the type illustrated in FIGURE 9. The opposite side of relay contacts 274 from junction 273 are connected with a junction 280. The junction 280 is connected with the collector electrode of transistor 266 and is also connected with terminal 281 of the voltage regulating circuit. The junctions 280 and 281 are connected to one side of the main actuating coil winding 275 at junction 282. The opposite side of main coil winding 275 is connected with a junction 283 which is in turn connected with junction 284 of the voltage regulating circuit. The accelerating coil winding of the relay has one side thereof connected with junction 283 and has its opposite side connected to resistor 285. The resistor 285 is connected with junction 286 which is connected to one side of resistor 287 and to junction 273. A silicon diode or other type of rectifier 290 is connected directly between junctions 271 and 283.

The junction 284 of the regulating circuit 220 is connected with a lead 292 which is in turn connected between relay contacts 248 and terminal 234 of the generator-rectifier combination 222. The terminal 272 of voltage regulating circuit 220 is connected with terminal 236 of the generator-rectifier via lead 294.

It can be seen from an inspection of the voltage regulating circuit 220 that the accelerating winding 276 is connected between terminal 283 and ground through resistor 285 and relay switch contacts 274. This is different from the connection of the accelerator winding in FIGURE 8 as in FIGURE 8 the accelerating winding is connected across the output terminals of the rectifier but is also connected in series with the emitter-base circuit of the transistor. It has been found that the particular connection of the accelerating winding in FIGURE 10 brings about an improved result in the response of the regulating circuit.

The operation of the circuit illustrated in FIGURE 10 will now be described: When the ignition switch 252 is closed, the field relay actuating coil 246 is energized to cause the closure of switch contacts 248. The closure of switch contacts 248 connects the junctions 254, and 256, and the lead 250 with one side of field winding 232 via leads 264 and 292. With the engine 242 operating, a voltage will be impressed across the bridge rectifier circuit which will be in turn impressed between ground and lead 250. The current flow through field winding 232 as a result of the voltage being developed may be traced from lead 250, through lead 264, through lead 292, through field winding 232, through lead 294 to terminal 272, through the emitter-to-collector circuit of transistor 266, and thence to ground via terminal 281. It can be seen that the field current through field 232 will thus be controlled as a function of emitter-collector circuit conductance of the transistor 266 and the conductance of the transistor is varied in accordance with the output voltage of the bridge rectifier 228.

The conductance of the transistor 266 is controlled by the opening and closing of contacts 274 which are magnetically opened and closed in response to the energization of the actuating coils 275 and 276. When the voltage is below some predetermined value, the actuating coils 275 and 276 are not energized sufficiently to open the contacts for at this time the contacts are held normally closed by a spring 300. In this condition of operation, both the main actuating coil 275 and the accelerating actuating coil 276 will be energized and the coils are wound so that their fluxes are additive. When the voltage between lead 250 and ground exceeds some predetermined desired value, the coil windings 275 and 276 are energized sufficiently to cause the opening of contacts 274 against the force of spring 300.

During the time that the contacts 274 are closed, base current may flow from emitter to base in transistor 266 through terminal 273, switch contacts 274, junction 280, and thence directly to ground via junction 281. When base current is permitted to flow in the transistor, the transistor becomes substantially fully conductive from emitter to collector in order to greatly increase the field current and thus tend to increase the output voltage of the generator-rectifier. As the output voltage increases, at some point the switch contacts 274 are opened to open the base circuit of transistor 266 and thus prevent emitter-to-base current with a consequent cutting off of emitter-to-collector current. The transistor then becomes substantially non-conductive to reduce field current through field winding 232 with a consequent drop in output voltage of the generator-rectifier.

It will be, of course, appreciated that the fluxes generated by the coils 275 and 276 are additive, and that the accelerator coil winding 276 is only energized when the switch contacts 274 are closed. This provides a voltage regulating circuit having highly desirable response characteristics, and the voltage is regulated in a simple and exact manner. The diode 290 is included in the circuit to suppress transient voltage surges appearing across the field winding 232.

While the embodiments of the present invention as herein disclosed constitute a preferred form, it is to be understood that other forms might be adopted.

What is claimed is as follows:

1. In a motor vehicle electrical system, the combination comprising, a direct-current power source having output terminals and a control winding, a transistor having base, collector and emitter electrodes, means connecting said control winding and the emitter-collector circuit of said transistor in series across said output terminals, a relay of the electromagnetic vibratory type having a pair of switch contacts and including a main actuating coil and an accelerating actuating coil, means connecting said switch contacts and the emitter-base circuit of said transistor in series across said output terminals, means connecting said main actuating coil directly across said output terminals, and means connecting said accelerating actuating coil in series with said switch contacts and directly across said output terminals.

2. In a motor vehicle electrical system, the combination comprising, a direct-current power source having output terminals and a control winding, a transistor having base, collector and emitter electrodes, means connecting said control winding and the emitter-collector circuit of said transistor in series across said output terminals, a relay of the electromagnetic vibratory type having a pair of switch contacts and including a main actuating coil and an accelerating actuating coil, means connecting said switch contacts and the emitter-base circuit of said transistor in series across said output terminals, means connecting said main coil winding directly across said output terminals, and means connecting said accelerating winding in circuit with said output terminals and said relay switch contacts whereby said accelerating winding is energized directly through said switch contacts and only when said switch contacts are closed.

3. In a motor vehicle electrical system, the combination comprising, a direct current power source having output terminals and a control winding, a three terminal semiconductor having a control terminal and a pair of output terminals, means connecting said control winding and the output terminals of said semiconductor in series across the output terminals of said power source, a relay of the electromagnetic vibratory type having a pair of switch contacts and including a main actuating coil and an accelerating coil, means connecting said switch contacts, said semiconductor control terminal and one of said semiconductor output terminals in series and across the output terminals of said power source, means connecting said main coil directly across the output terminals of said power source, and a circuit including said switch contacts connecting said accelerating coil across the output terminals of said power source.

4. In a motor vehicle electrical system, the combination comprising, a direct-current power source having a pair of output terminals and including a generator having a field winding, an engine, torque transmitting means connecting said engine and generator, a transistor having base, emitter and collector electrodes, a relay having a pair of switch contacts and including a main actuating coil and an accelerating actuating coil, means connecting one side of said field winding directly to one of said output terminals, means connecting the opposite side of said field winding with said emitter electrode, means connecting the collector electrode of said transistor directly with the other of said direct-current output terminals, means connecting one side of said accelerating winding with the base electrode of said transistor, means connecting the opposite side of said accelerating winding with said other direct-current output terminal through said relay switch contacts, and means connecting said main actuating coil winding directly across said direct-current output terminals.

5. In a motor vehicle electrical system, the combination comprising, an alternating-current generator having an output winding and a field winding, rectifier means connected with said output winding having first and second D.-C. output terminals, an engine, torque transmitting means connecting said engine and generator whereby said generator is driven by said engine, a transistor having base, collector and emitter electrodes, a relay of the electromagnetic vibratory type having a pair of switch contacts and including a main actuating coil and an accelerating actuating coil, means connecting said field winding between said first D.-C. output terminal and said emitter electrode, means connecting the collector electrode of said transistor with said second output terminal, means connecting said accelerating winding and said relay switch contacts in series with each other and between said transistor base electrode and said second D.-C. output terminal, and means connecting said main actuating winding across said D.-C. output terminals.

6. In a motor vehicle electrical system, the combination comprising, a direct-current power source having output terminals and a control winding, a transistor having base, collector and emitter electrodes, means connecting said control winding and the emitter-to-collector circuit of said transistor in series across said output terminals, a relay of the electromagnetic vibratory type having a pair of switch contacts and including a main actuating coil and an accelerating actuating coil, means connecting said switch contacts, said accelerating coil and the emitter-to-base circuit of said transistor in series and across said output terminals, and means connecting said main actuating coil across said output terminals.

7. In a motor vehicle electrical system, the combination comprising, a direct current power source having output terminals and a control winding, a transistor having emitter, base and collector electrodes, a relay of the electromagnetic vibratory type having a pair of switch contacts and including a main actuating coil and an accelerating coil, a first current path connecting said output terminals including the emitter-collector circuit of said transistor and said control winding, a second current path connecting said output terminals including the emitter-base circuit of said transistor and said switch contacts, a third current path connecting said output terminals including said accelerating coil and said switch contacts, and means connecting said main actuating coil across said output terminals across said switch contacts and accelerating winding.

References Cited in the file of this patent

UNITED STATES PATENTS

| | | | |
|---|---|---|---|
| 1,936,692 | Stoller | Nov. 28, | 1933 |
| 2,052,048 | Leece | Aug. 25, | 1936 |
| 2,218,109 | Hochstetter | Oct. 15, | 1940 |
| 2,218,748 | Haas | Oct. 22, | 1940 |
| 2,809,301 | Short | Oct. 8, | 1957 |

UNITED STATES PATENT OFFICE
CERTIFICATE OF CORRECTION

Patent No. 2,992,383            July 11, 1961

Lewis R. Hetzler et al.

It is hereby certified that error appears in the above numbered patent requiring correction and that the said Letters Patent should read as corrected below.

Column 13, line 7, after "terminals" insert -- and --.

Signed and sealed this 28th day of November 1961.

(SEAL)
Attest:

ERNEST W. SWIDER            DAVID L. LADD
Attesting Officer            Commissioner of Patents

USCOMM-DC